(12) United States Patent
Gerding

(10) Patent No.: US 8,383,285 B2
(45) Date of Patent: *Feb. 26, 2013

(54) GAS DIFFUSION UNIT

(75) Inventor: Lars Gerding, Weinheim (DE)

(73) Assignee: Carl Freudenberg KG, Weinheim (DE)

( * ) Notice: Subject to any disclaimer, the term of this patent is extended or adjusted under 35 U.S.C. 154(b) by 818 days.

This patent is subject to a terminal disclaimer.

(21) Appl. No.: 12/223,510

(22) PCT Filed: Feb. 9, 2006

(86) PCT No.: PCT/EP2006/001125
§ 371 (c)(1),
(2), (4) Date: Sep. 29, 2008

(87) PCT Pub. No.: WO2007/090423
PCT Pub. Date: Aug. 16, 2007

(65) Prior Publication Data
US 2009/0029233 A1    Jan. 29, 2009

(51) Int. Cl.
*H01M 8/02* (2006.01)
*H01M 4/86* (2006.01)
*H01M 8/10* (2006.01)

(52) U.S. Cl. .......................... 429/480; 429/481

(58) Field of Classification Search .............. 429/474, 429/480, 481
See application file for complete search history.

(56) References Cited

U.S. PATENT DOCUMENTS

| | | | |
|---|---|---|---|
| 6,423,194 B1* | 7/2002 | Furuya | 204/284 |
| 6,872,485 B2 | 3/2005 | Inoue et al. | |
| 2002/0068215 A1* | 6/2002 | Hamada et al. | 429/42 |
| 2002/0195335 A1* | 12/2002 | Cisar et al. | 204/283 |
| 2003/0082430 A1* | 5/2003 | Suzuki | 429/36 |
| 2004/0091765 A1* | 5/2004 | Lee et al. | 429/38 |
| 2004/0191601 A1* | 9/2004 | Grot | 429/30 |
| 2004/0214071 A1* | 10/2004 | Barnett et al. | 429/44 |
| 2005/0095490 A1 | 5/2005 | Mittelstadt et al. | 429/35 |
| 2006/0105231 A1* | 5/2006 | McLean | 429/122 |
| 2006/0210865 A1* | 9/2006 | Inoue | 429/44 |

FOREIGN PATENT DOCUMENTS

| | | |
|---|---|---|
| CA | 2 533 469 | 3/2005 |
| EP | 1 633 010 | 3/2006 |
| JP | 2002-042837 | 2/2002 |
| JP | 2002158018 A * | 5/2002 |
| JP | 2005-108565 | 4/2005 |
| JP | 2006-031963 | 2/2006 |
| WO | WO 2004/100295 | 11/2004 |
| WO | WO 2004/114451 | 12/2004 |

OTHER PUBLICATIONS

International Search Report Issued in Corresponding International Patent Application No. PCT/EP2006/001125.

* cited by examiner

*Primary Examiner* — Gregg Cantelmo
(74) *Attorney, Agent, or Firm* — Pearl Cohen Zedek Latzer, LLP

(57) ABSTRACT

A gas diffusion unit for a fuel cell, having at least two planar gas diffusion layers on whose edges seals are configured, at least two gas diffusion layers being joined together in an articulated manner.

14 Claims, 9 Drawing Sheets

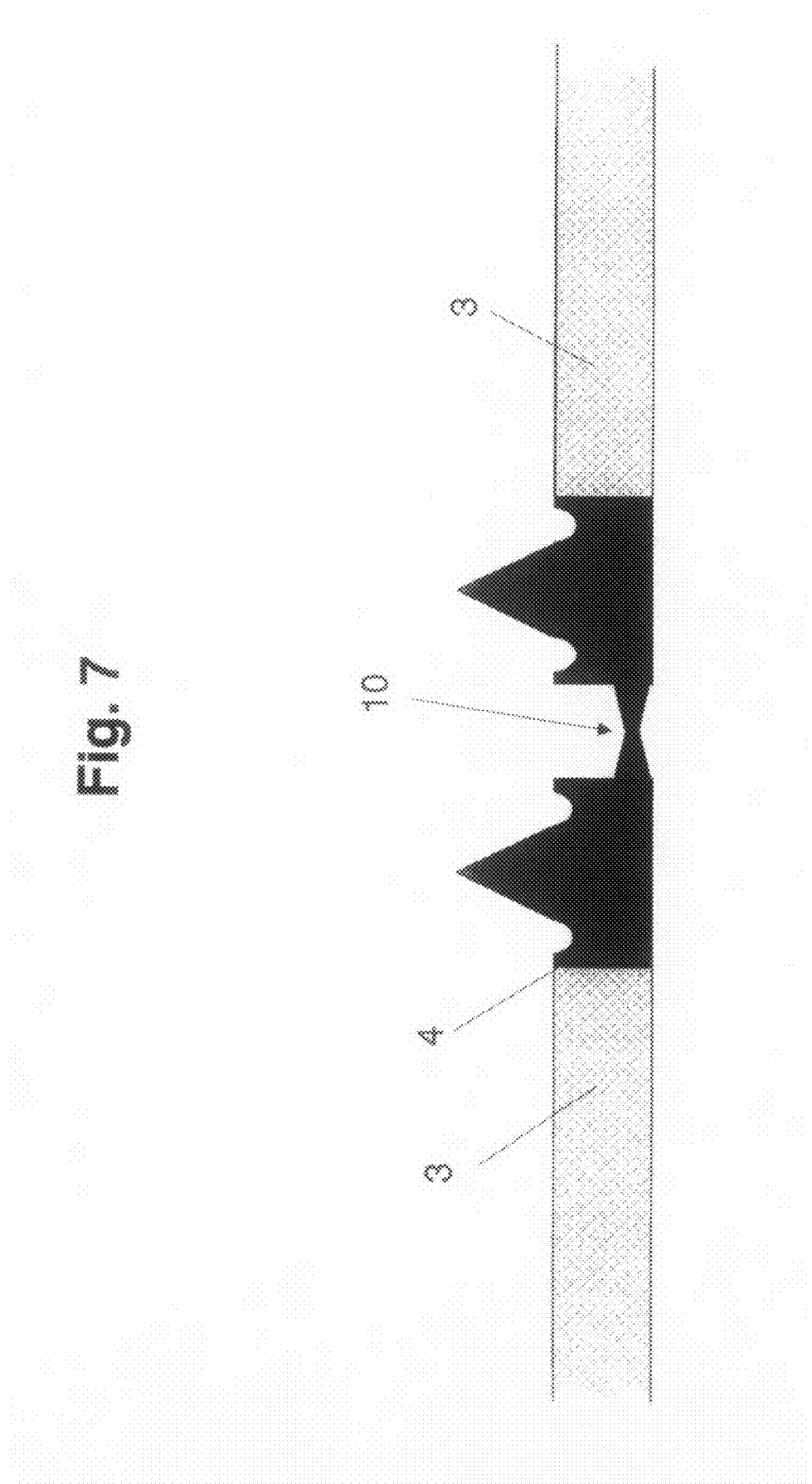

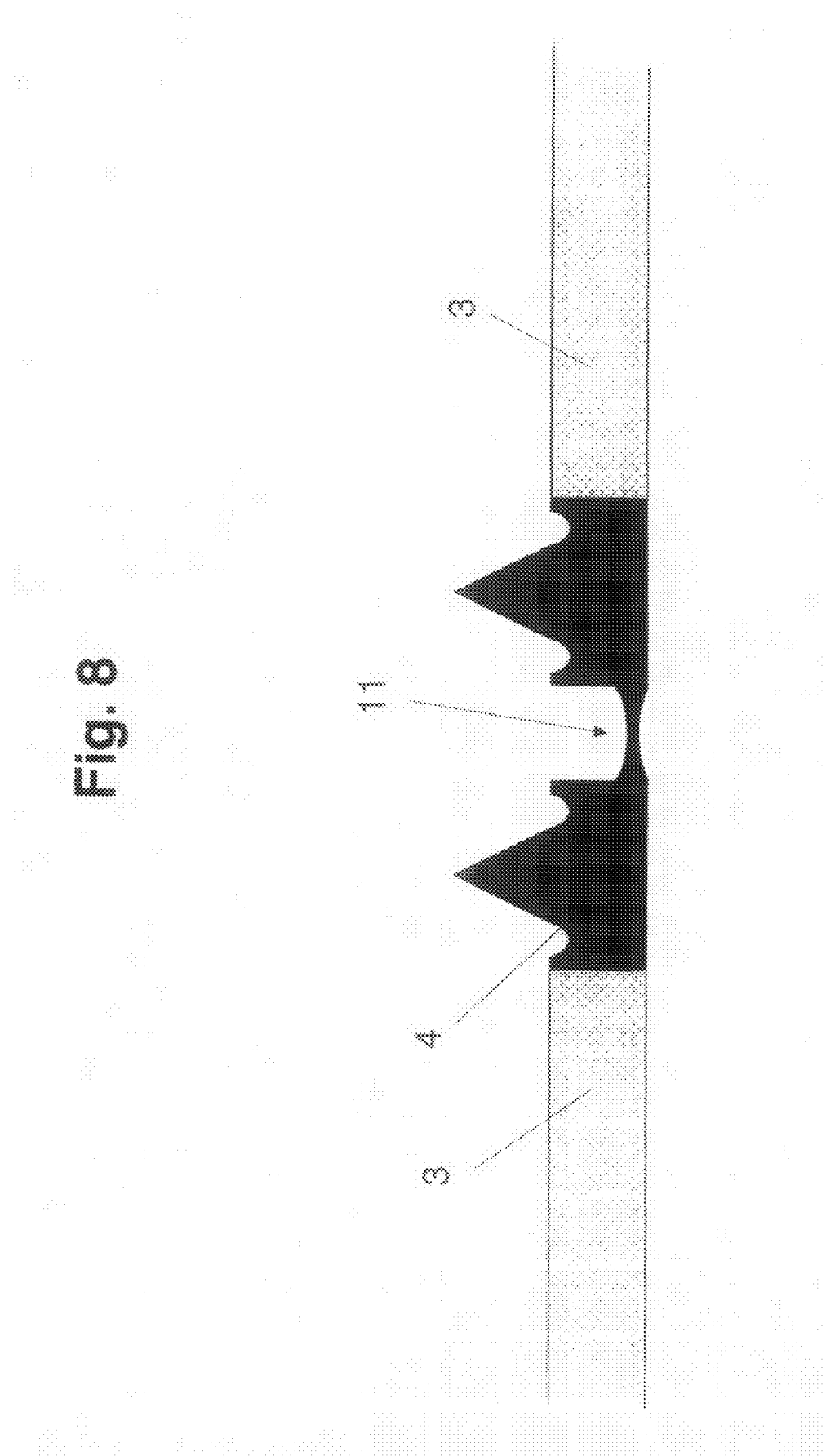

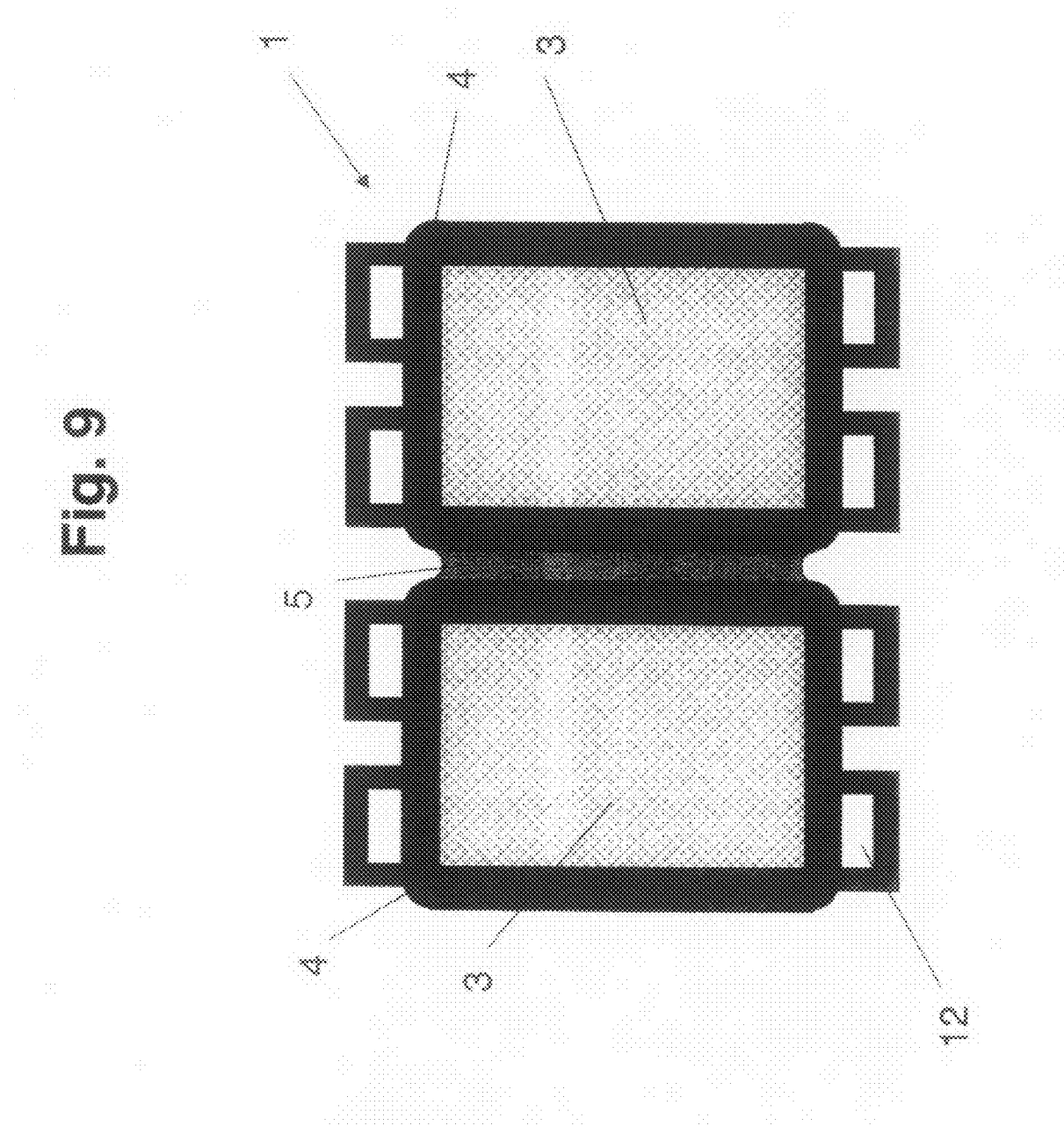

GAS DIFFUSION UNIT

This application is a national phase of International Application No. PCT/EP2006/001125, filed Feb. 9, 2006.

FIELD OF THE INVENTION

The present invention relates to a gas diffusion unit for a fuel cell, having at least two planar gas diffusion layers on whose edges seals are configured.

BACKGROUND OF THE INVENTION

Fuel cells are composed of individual, serially interconnected cells. These form what is generally referred to as a stack or cell stack, into which additional cooling components are frequently integrated. In this context, a stack may include up to 500 individual cells. A cell is characterized by a layered structure, one cell being composed of an arrangement made up of two bipolar plates having a gas distribution structure, two gas diffusion layers and of a reaction layer in the form of a catalyzed membrane. Two gas diffusion layers surround the reaction layer and form a membrane-electrode assembly. To prevent leakage, the membrane-electrode assembly or the bipolar plate is provided with a seal. Leakage can lead to destruction of the fuel cell, and it degrades the efficiency thereof. From the U.S. Patent Application 2003/0082430 A1, a gas diffusion unit is known where the seal is injection molded onto the planar gas diffusion layer. During assembly, it is difficult to mutually align the gas diffusion layers in a way that imperviously seals the contact regions of the gas diffusion layer and the reaction layer, as well as of the gas diffusion layer and bipolar plate.

SUMMARY OF THE INVENTION

An object of the present invention is to devise a gas diffusion unit that will be simpler to assemble and thereby provide reliable sealing.

This objective is achieved by the features of claim 1. Advantageous embodiments are delineated in the dependent claims.

To achieve the aforementioned objective, an embodiment of the present invention includes a gas diffusion unit for a fuel cell including at least two planar gas diffusion layers on whose edges seals are configured wherein at least two gas diffusion layers are joined together in an articulated manner. In the ready-for-use state, a membrane is configured between the gas diffusion layers. The articulated connection defines a swivel axis about which the gas diffusion layers are able to swivel in relation to one another. To produce a membrane-electrode assembly, first, the membrane is placed between the layers, and the gas diffusion layers are subsequently swiveled toward one another. The predefined swiveling motion ensures that the two gas diffusion layers and the seals thereof are positioned in mutual alignment. Leakage is reliably prevented by the precise alignment of the seals. In other embodiments, the seal may be configured on a supporting frame made of a polymer material.

The seals of the gas diffusion layers may be interconnected. Using simple means and without employing any additional elements, the connection may provide a movable connection of the gas diffusion layers.

The seals may be formed of uniform material and in one piece. The seals of the gas diffusion layers are thereby interconnected. The seals may be manufactured inexpensively.

The seals may be joined together by a connection strip. In this context, a connection strip is constituted of a film hinge which pivotably interconnects the gas diffusion layers. At the same time, the connection strip forms a defined region which permits an overflowing of the material during production. As a result, all seals may be manufactured in one sequence of operation.

In another embodiment, the seals may be interconnected by crosspieces. The crosspieces likewise form a pivotable and, moreover, material-saving connection of the gas diffusion layers.

The connection strip or the crosspiece may feature a longitudinally extending notch or taper, at least on one side. The notch and the taper make it possible for the axis of motion to be more precisely defined and thus for the gas diffusion layers to be more effectively aligned, resulting, in turn, in an improved sealing action.

The seals may be made of an elastic polymer material. Elastomer materials are elastic, highly deformable and readily workable. The seals may be made of silicon, FKM (fluoroelastomer), EPDM (ethylene propylene dien monomer), PIB (polyisobutylene), PU (polyurethane), BR (butadiene) or of a blend thereof. The blending process makes it possible to selectively combine the advantageous properties of the individual materials. Fluoroelastomers are characterized by a good resistance to temperature and to chemicals, which proves to be particularly advantageous in the fuel cell environment.

Also conceivable as sealing material in other embodiments are thermoplastic materials, such as thermoplastic elastomers (TPE), for example. The latter are advantageously processible within short cycle times, as in the case of thermoplastic materials.

All of the mentioned materials have the advantage of being processible by shaping processes.

Conceivable manufacturing methods for affixing a seal to the gas diffusion layer include injection molding, compression molding, adhesive bonding and casting. Low tool and machine costs make compression molding an especially favorable manufacturing method which makes it possible to produce the seals to the narrow tolerances typical of fuel cells, and to a high dimensional accuracy.

Adhesive bonding renders possible a modular type of production, in which various seal designs may be combined with various designs of gas diffusion layers. Its flexibility makes it especially suited for a relatively small-volume production. The seals may be injection molded onto the gas diffusion layer. Injection molding is a manufacturing method that is suitable for large-scale production. The process of injection molding onto the gas diffusion layers produces a peripheral seal which completely surrounds a reaction layer configured between the gas diffusion layers, thereby preventing leakage. During the injection molding process, it is advantageous that the sealing material that is injection molded onto the gas diffusion layer penetrates into the gas diffusion layer. The penetration is effected in particular when working with gas diffusion layers made of a nonwoven fabric. The sealing action, as well as the manipulability are again thereby improved.

The seals may at least have an at least partially peripherally extending sealing bead. The sealing bead may, in particular, have a V-shaped form. A sealing bead improves the sealing action and simplifies the assembly of the membrane-electrode assembly. For the assembly operation, the interconnected gas diffusion layers, together with the membrane configured therebetween, are pressed together between bipolar plates by screw connections. Due to the small contact surface area of the sealing bead, the clamping force is initially small, but intensifies in response to increasing compression. Once the sealing bead is fully compressed, the adjacent planar sealing region engages, and the clamping force increases disproportionally, which may be indicative of a correct clamping force and thus sealing force. An overpressing of the seal due to an excessive clamping force is thereby prevented. Moreover, the sealing bead compensates for tolerances and unevenness of the surface to be sealed.

The gas diffusion unit may be less than 2 mm thick. This makes it possible to design especially compact fuel cells, in particular for mobile applications or for small electrical devices.

The seals may at least have an at least partially peripherally extending sealing bead and an at least partially peripherally extending recess, the recess being configured adjacently to the sealing bead. The recesses make space available into which the material of the sealing bead may be displaced in response to increasing clamping force. Excessive strains are thereby prevented that could lead to tearing or buckling of the sealing bead. The sealing action is improved.

The seals may also extend peripherally around the passages provided in the bipolar plates for supplying the reaction and cooling media. Since these regions react very sensitively to any misalignment of the seal during assembly, the invention provides additional advantages in this case. In this manner, the various requirements of fuel cell seals are met cost-effectively by only one sealing element.

The gas diffusion layer may include a nonwoven fabric. Nonwoven fabrics are inexpensive and form a stable gas diffusion layer. Moreover, the nonwoven fabric forms a good adhesive base for the sealing material, since the material of the seal is able to penetrate into the nonwoven fabric due to the porosity thereof. In this context, the nonwoven fabric is typically carbonized. The gas diffusion layer may feature a porous nonwoven fabric that contains carbon fiber objects or carbon objects. Carbon fibers improve the electrical conductivity of the gas diffusion layer.

BRIEF DESCRIPTION OF THE DRAWING

A few exemplary embodiments of the gas diffusion unit according to the present invention are clarified in the following with reference to the figures. They show schematically:

FIG. 7: a tapered, articulated connection of the gas diffusion units;
FIG. 8: a notched, articulated connection of the gas diffusion units;
FIG. 9: a gas diffusion unit having connection strips and sealing elements around the regions of the reaction media inlet port.

DETAILED DESCRIPTION

Figure 1:
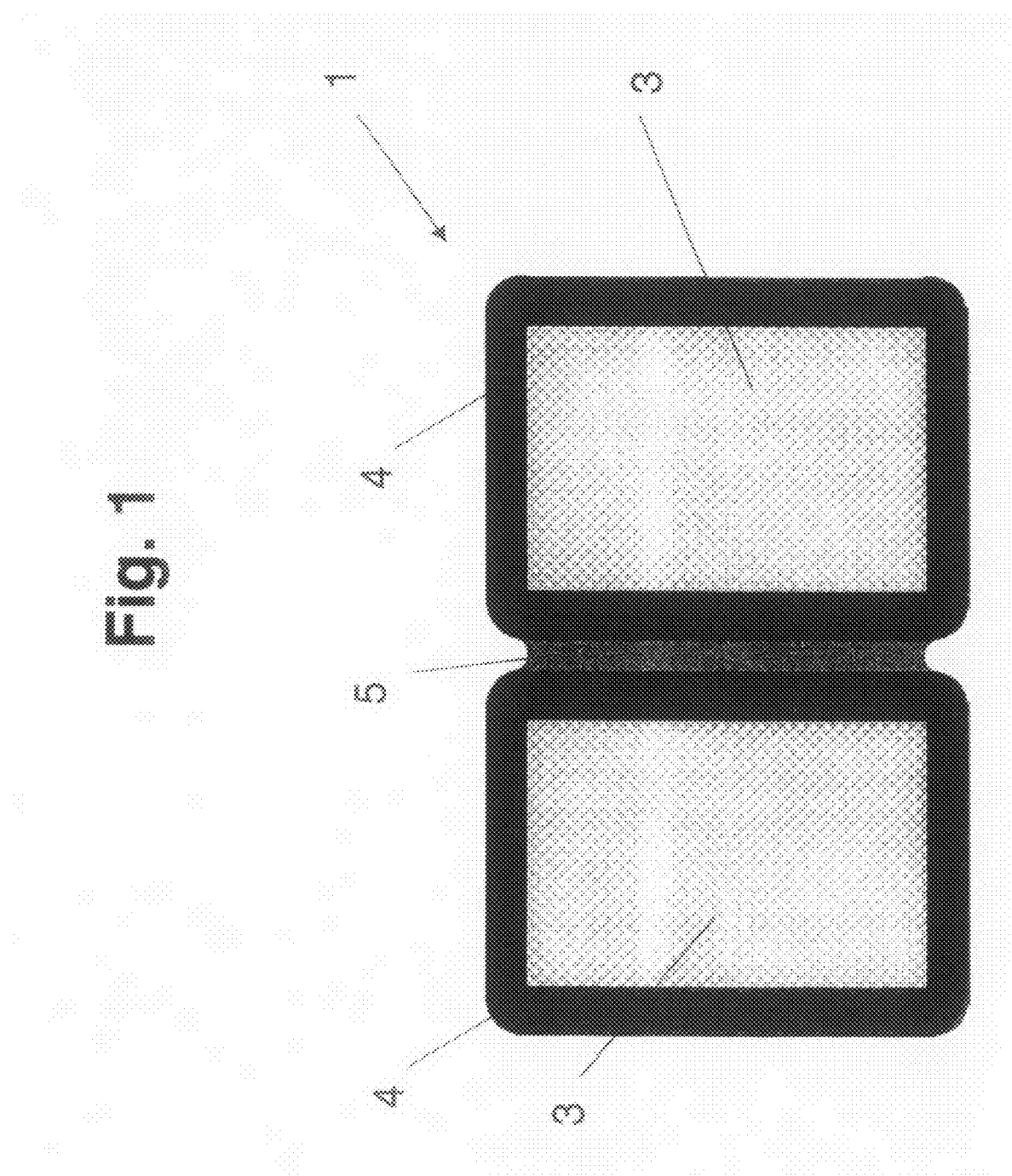
FIG. 1: a gas diffusion unit having a connection strip.

FIG. 1 shows a gas diffusion unit 1 for a fuel cell 2 composed of two planar gas diffusion layers 3. Gas diffusion layers 3 are made of a carbonized nonwoven fabric, seals 4 being configured at the perimeters of gas diffusion layers 3. In this variant, seals 4 are made of a composition that includes silicon and were affixed to gas diffusion layers 3 by injection molding, the sealing material having penetrated into the pores of the nonwoven fabric. In other variants, the seal may also be made of thermoplastic elastomers, EPDM (ethylene propylene dien monomer), PIB (polyisobutylene), PU (polyurethane), BR (butadiene) or of a blend of these materials, including silicon. Seals 4 of both gas diffusion layers 3 are formed of uniform material and in one piece and, in this variant, are joined together by a connection strip 5. The two gas diffusion layers 3 are joined together by connection strip 5 in an articulated manner.

Figure 2:
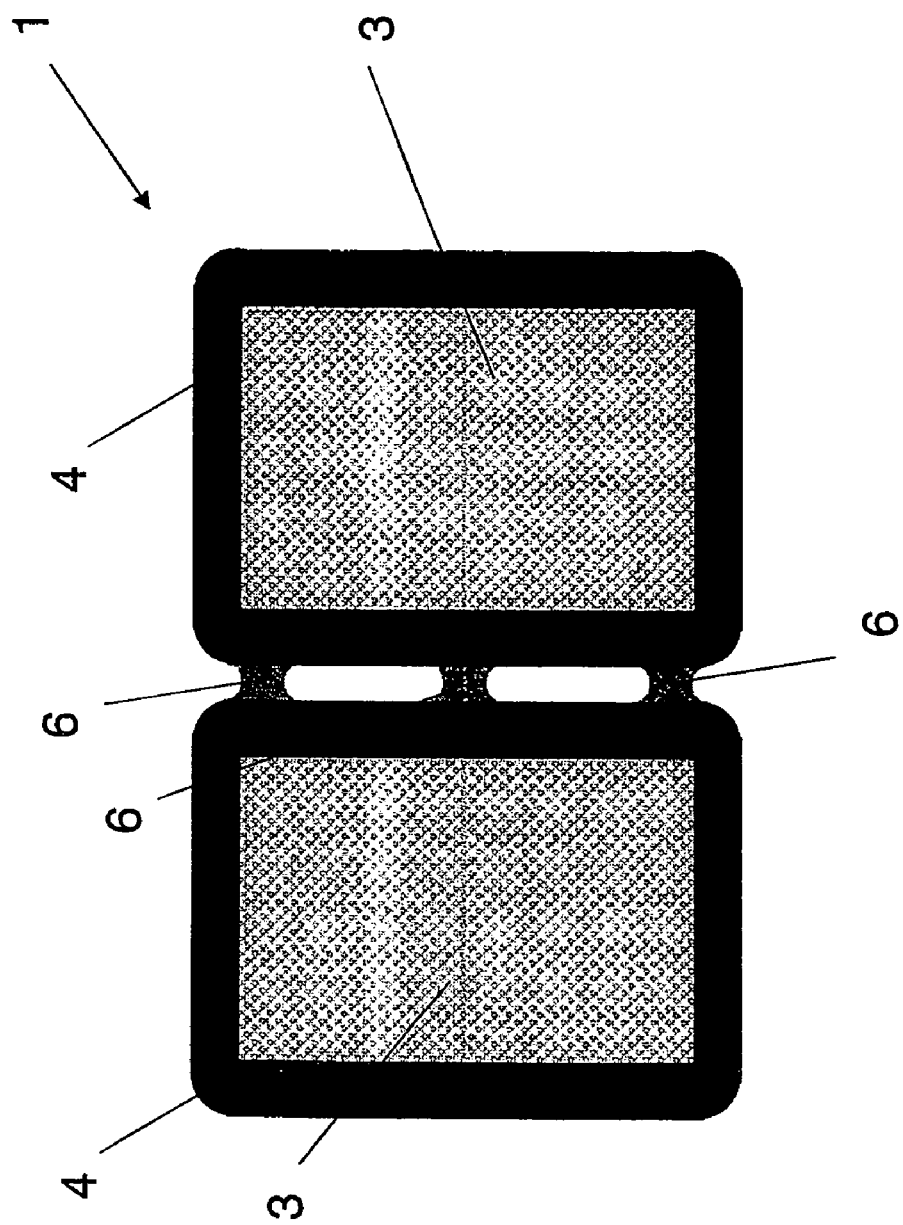
FIG. 2: a gas diffusion unit having connection crosspieces.

FIG. 2 shows a gas diffusion unit 1 according to FIG. 1, in this variant, seals 4 being interconnected by crosspieces 6.

Figure 3:
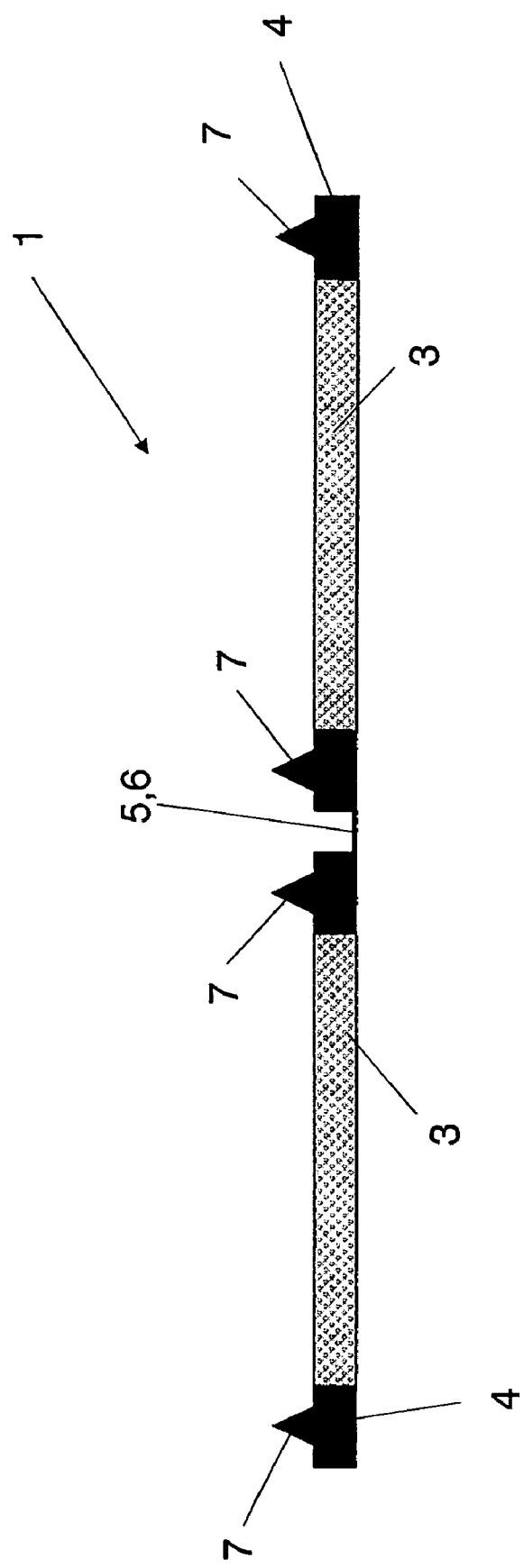
FIG. 3: a gas diffusion unit following the injection molding operation.
Figure 4:
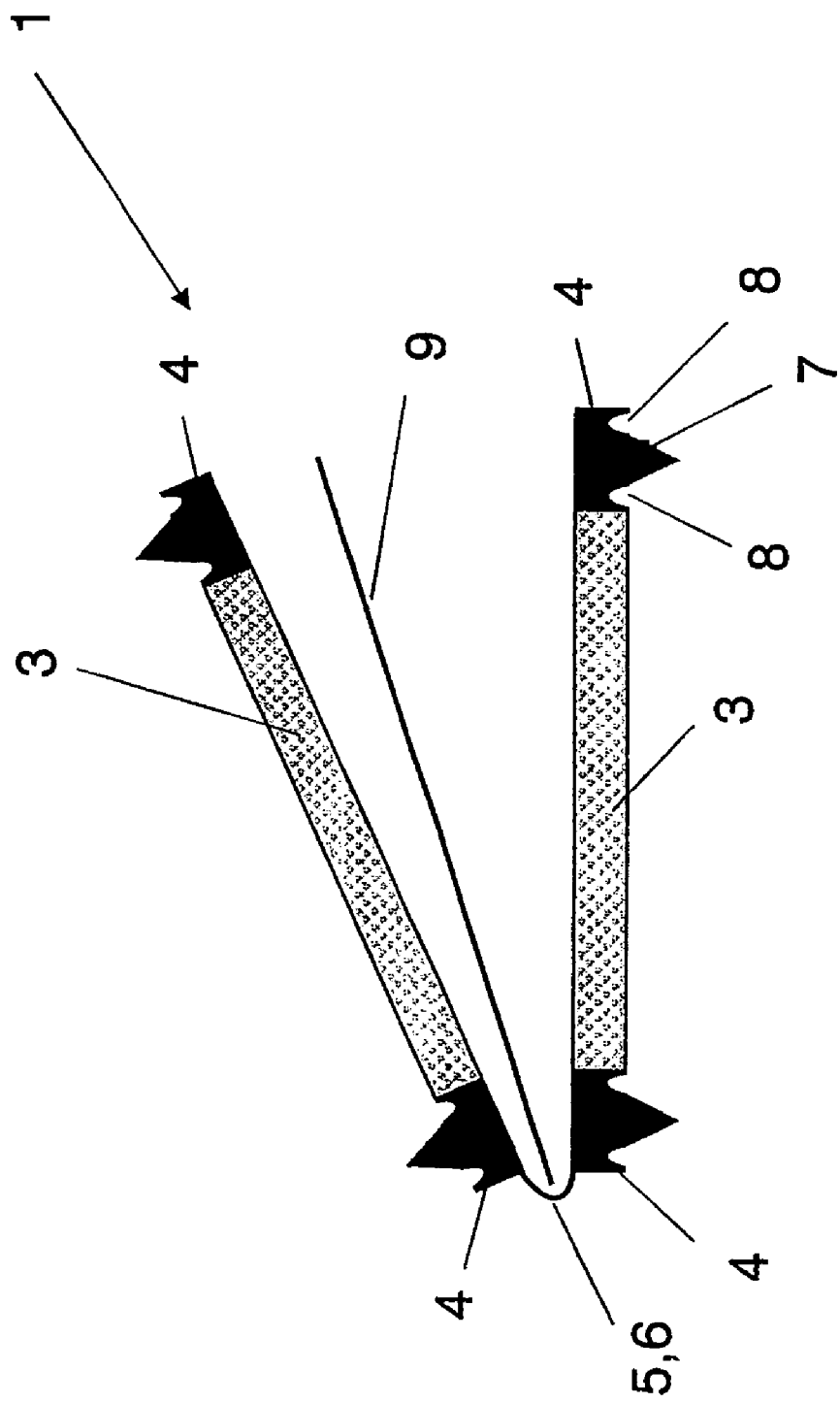
FIG. 4: a gas diffusion unit having an inserted reaction layer.
Figure 5:
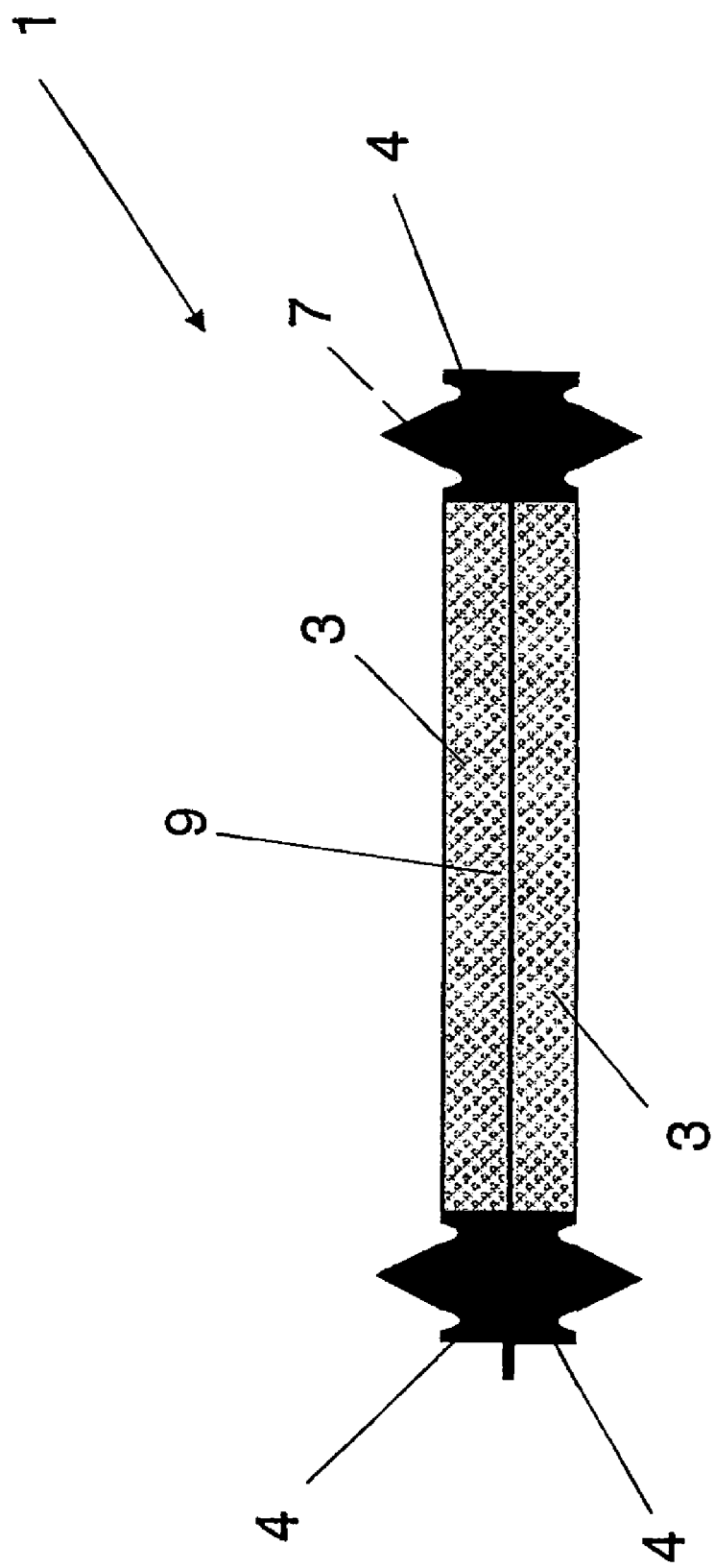
FIG. 5: a ready-for-use gas diffusion unit.

FIG. 3 through 5 illustrate the steps for manufacturing a gas diffusion unit 1 which entail configuring a membrane 9 between gas diffusion layers 3. Membrane 9 is made of a polymer. For the fabrication process, membrane 9 is placed on a gas diffusion layer 3, and the two gas diffusion layers 3 are swiveled toward one another, thereby positioning membrane 9 therebetween. The swiveling motion of gas diffusion layers 3 is predefined by the articulated connection thereof, so that the two gas diffusion layers 3 center themselves independently, and seals 4 come to rest against one another, thereby sealing membrane 9 on both sides.

Seals 4 have a peripherally extending sealing bead 7, which, following assembly, is located on the side facing away from membrane 9 and points in the direction of the bipolar plate (not shown). In addition to sealing bead 7, seal 4 shown in FIG. 5 has two peripherally extending recesses 8 which are configured on both sides adjacently to sealing bead 7.

Figure 6:
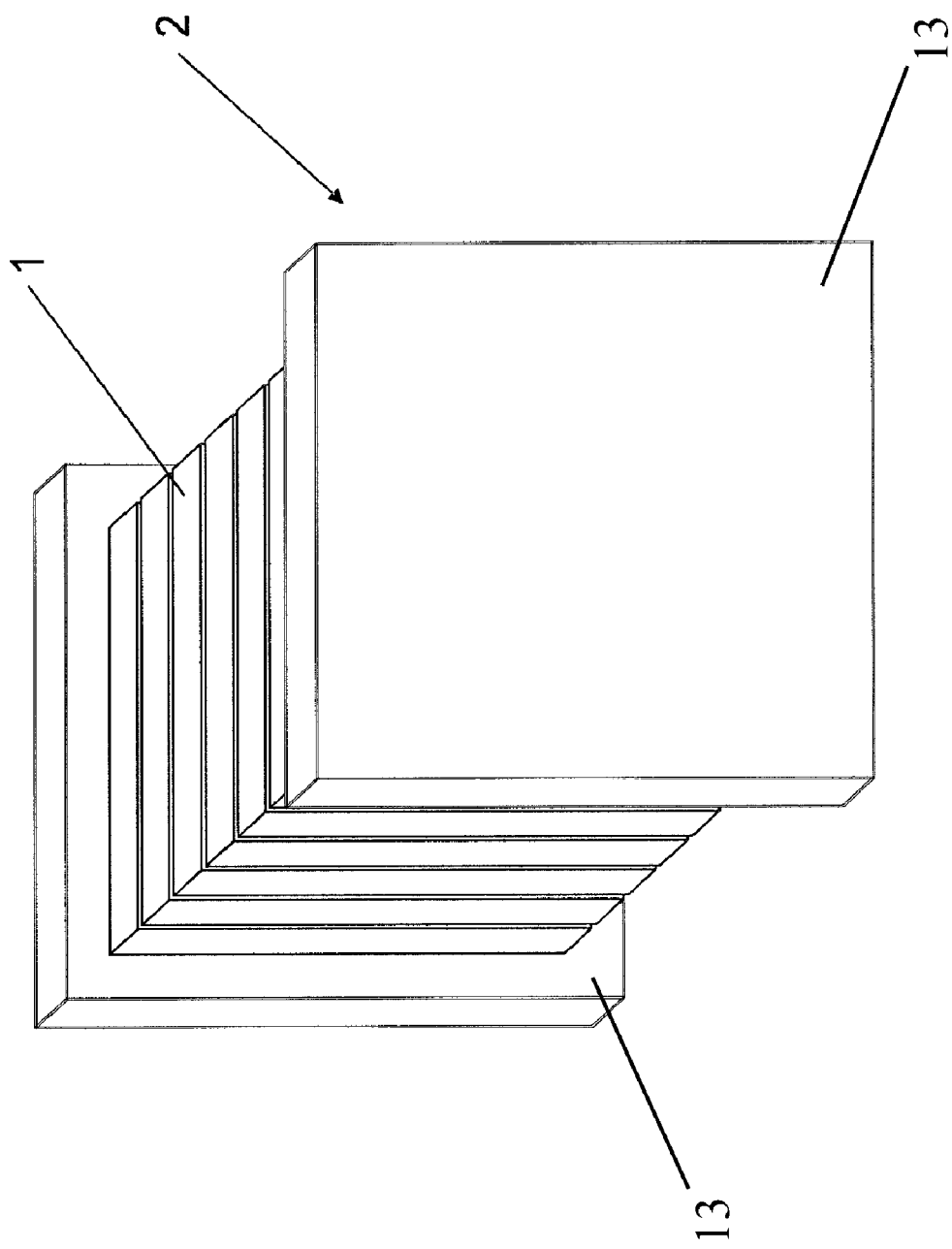
FIG. 6: a fuel cell having a gas diffusion unit configured between bipolar plates according to the present invention.

FIG. 6 shows a fuel cell 2 for mobile applications. Gas diffusion units 1, which are configured between bipolar plates 13 in fuel cell 2, have a thickness of less than one millimeter.

FIG. 7 shows a connection of gas diffusion layers 3 which, in the variant according to FIG. 1, is formed by a connection strip 5 and, in the variant according to FIG. 2, by crosspieces 6. The connection features a notch 10 that is approximately centrally disposed on both sides. In the variant according to FIG. 8, the connection features a circular segment-shaped taper 11 that is approximately centrally disposed on both sides.

FIG. 9 shows a gas diffusion unit 1 according to FIG. 1, seals 4 additionally extending peripherally around the regions of reaction media inlet port 12.

What is claimed is:

1. A gas diffusion unit for a fuel cell, comprising:
at least two planar gas diffusion layers on whose edges seals are configured, wherein the at least two gas diffusion layers are joined together by an articulated connection, wherein the articulated connection defines a swivel axis for permitting pivoting of one diffusion layer onto another about the connection; and
wherein the seals of the gas diffusion layers are interconnected by crosspieces.

2. The gas diffusion unit as recited in claim 1, wherein the seals are formed of uniform material and in one piece.

3. The gas diffusion layer as recited in claim 1, wherein each crosspiece has a notch or a taper that extends in the longitudinal direction of the crosspiece, at least on one side.

4. The gas diffusion unit as recited in claim 1, wherein the seals are made of an elastic polymer material.

5. The gas diffusion unit as recited in claim 1, wherein the seals are made of silicon, fluoroelastomer (FKM), ethylene propylene dien monomer (EPDM), polyisobutylene (PIB), thermoplastic elastomers (TPE) or of a blend thereof.

6. The gas diffusion unit as recited in claim 1, wherein the seals are produced in a shaping process.

7. The gas diffusion unit as recited in claim 1, wherein the seals are injection molded onto the gas diffusion layer.

8. The gas diffusion unit as recited in claim 1, wherein the seals at least have an at least partially peripherally extending sealing bead.

9. The gas diffusion unit as recited in claim 1, wherein the gas diffusion unit is less than 2 mm thick.

10. The gas diffusion unit as recited in claim 1, wherein the seals at least have an at least partially peripherally extending sealing bead and an at least partially peripherally extending recess, the recess being configured adjacently to the sealing bead.

11. The gas diffusion unit as recited in claim 1, wherein the gas diffusion layers are able to swivel about the swivel axis in relation to one another.

12. The gas diffusion unit as recited in claim 3, wherein said notch or taper defines said swivel axis.

13. A gas diffusion unit for a fuel cell, comprising,
at least two planar gas diffusion layers on whose edges seals are configured, wherein the at least two gas diffusion layers are joined together by an articulated connection, wherein the articulated connection defines a swivel axis for permitting pivoting of one diffusion layer onto another about the connection; and
wherein the seals of the gas diffusion layers are formed of uniform material and in one piece; and
wherein the seals of the gas diffusion layer are joined together by a connection strip having one longitudinal extending notch or taper at least on one side, wherein said notch or taper defines said swivel axis.

14. A gas diffusion unit for a fuel cell, comprising:
at least two planar gas diffusion layers on whose edges seals are configured,
wherein the at least two gas diffusion layers are joined together by an articulated connection, wherein the articulated connection defines a swivel axis for permitting pivoting of one diffusion layer onto another about the connection, and
wherein the fuel cell comprises at least two bipolar plates in which are provided passages for supplying reaction media, wherein the seals extend peripherally around the passages to additionally seal off the passages.

* * * * *